United States Patent
Zhang

(10) Patent No.: US 9,341,497 B2
(45) Date of Patent: May 17, 2016

(54) METHOD AND SYSTEM FOR PUSHING POINT OF INTEREST INFORMATION

(71) Applicant: Baidu Online Network Technology (Beijing) Co., Ltd, Beijing (CN)

(72) Inventor: Jinjie Zhang, Beijing (CN)

(73) Assignee: Baidu Online Network Technology (Beijing) Co., Beijing (CN)

(*) Notice: Subject to any disclaimer, the term of this patent is extended or adjusted under 35 U.S.C. 154(b) by 0 days.

(21) Appl. No.: 14/586,860

(22) Filed: Dec. 30, 2014

(65) Prior Publication Data

US 2015/0362329 A1 Dec. 17, 2015

(30) Foreign Application Priority Data

Jun. 17, 2014 (CN) .......................... 2014 1 0270275

(51) Int. Cl.
| | |
|---|---|
| G01C 21/26 | (2006.01) |
| G01C 21/36 | (2006.01) |
| G01C 21/00 | (2006.01) |
| G06F 17/30 | (2006.01) |
| H04L 29/08 | (2006.01) |
| H04L 29/06 | (2006.01) |
| G01C 21/20 | (2006.01) |
| H04W 4/02 | (2009.01) |

(52) U.S. Cl.
CPC ............ G01C 21/3667 (2013.01); G01C 21/00 (2013.01); G01C 21/3679 (2013.01); G06F 17/30241 (2013.01); G06F 17/30867 (2013.01); H04L 67/06 (2013.01); H04L 67/42 (2013.01); H04W 4/02 (2013.01)

(58) Field of Classification Search
CPC ........ G01C 21/26; G01C 21/20; H04L 67/06; H04L 67/42

USPC .......................... 701/532, 438, 426, 409, 428
See application file for complete search history.

(56) References Cited

U.S. PATENT DOCUMENTS

| | | | | |
|---|---|---|---|---|
| 6,952,644 | B2* | 10/2005 | Nakagawa | G01C 21/36 340/995.1 |
| 7,254,481 | B2* | 8/2007 | Yamada | G01C 21/343 340/988 |
| 7,756,630 | B2* | 7/2010 | Dorfman | G06F 17/30241 701/426 |
| 7,873,468 | B2* | 1/2011 | Matsuura | G01C 21/3682 340/995.1 |
| 2004/0249686 | A1* | 12/2004 | Murphy | G06Q 10/02 705/5 |
| 2008/0281516 | A1* | 11/2008 | Cummings | G01C 21/3476 701/414 |
| 2012/0197714 | A1 | 8/2012 | Beyeler et al. | |
| 2013/0174076 | A1 | 7/2013 | Geelen | |
| 2014/0074395 | A1 | 3/2014 | Brown | |

OTHER PUBLICATIONS

Extended European Search Report, EP Application No. 14200740.0.

* cited by examiner

*Primary Examiner* — Tan Q Nguyen
(74) *Attorney, Agent, or Firm* — Orrick, Herrington & Sutcliffe, LLP

(57) ABSTRACT

The embodiments of the present invention provide a method for pushing point of interest information, comprising: displaying an electronic map; determining a target point of interest on the electronic map; acquiring an access identification of at least one piece of description information about the target point of interest; and displaying the access identification of the at least one piece of description information about the target point of interest. The embodiments of the present invention also provide a system for pushing point of interest information. According to the technical solutions provided in the embodiments of the present invention, the efficiency of pushing point of interest information can be improved.

18 Claims, 2 Drawing Sheets

METHOD AND SYSTEM FOR PUSHING POINT OF INTEREST INFORMATION

CROSS-REFERENCE TO RELATED APPLICATIONS

The present application claims priority to Chinese Patent Application No. CN201410270275.7, filed on Jun. 17, 2014, the entire disclosure of which is incorporated herein by reference in its entirety and for all purposes.

TECHNICAL FIELD

The present invention relates to the field of Internet applications, and in particular to a method and system for pushing point of interest information.

BACKGROUND

An electronic map is a map stored and viewed in a digital manner using computer technologies. The electronic map is usually stored using a vector image, and the scale of the map can be zoomed in, zoomed out or rotated without affecting the display effect. In the prior art, a map client which can display an electronic map usually uses a geographic information system to store and transmit map data so as to provide a location service and a navigation service, etc. for a user, which brings great convenience to the journey of the user.

However, while the map client provides a service for the user, if the user needs to know more information such as an introduction and a picture about a point of interest in the electronic map, the user needs to manually search for information about the point of interest on the Internet; if the point of interest is a scenic region, the user can manually control a terminal to quit the map client, and then open a tourist guide client in the terminal or directly use a tourist guide terminal to acquire scenic region information; therefore, currently the efficiency of providing point of interest information for a user is relatively low.

SUMMARY

In this regard, the embodiments of the present invention provide a method and system for pushing point of interest information, which can improve the efficiency of pushing point of interest information.

The embodiments of the present invention provide a method for pushing point of interest information, comprising:
  displaying an electronic map;
  determining a target point of interest on the electronic map;
  acquiring an access identification of at least one piece of description information about the target point of interest; and
  displaying the access identification of the at least one piece of description information about the target point of interest.

In the above-mentioned method, determining a target point of interest on the electronic map comprises:
  acquiring a candidate point of interest closest to a relevant terminal on the electronic map according to location information about the terminal and location information about the candidate point of interest;
  acquiring a distance threshold value of and path information about the candidate point of interest closest to the terminal; and
  regarding the candidate point of interest closest to the terminal as the target point of interest if the distance between the terminal and the candidate point of interest closest to the terminal is less than or equal to the distance threshold value and the path information comprises a motion path of the terminal.

In the above-mentioned method, determining a target point of interest on the electronic map comprises:
  acquiring at least one candidate point of interest closest to a relevant terminal on the electronic map according to location information about the terminal and location information about the candidate point of interest;
  acquiring user interest information about a client; and
  determining the target point of interest according to the user interest information and the at least one candidate point of interest.

In the above-mentioned method, determining a target point of interest on the electronic map comprises:
  determining the target point of interest according to a first trigger location on the electronic map;
  wherein the first trigger location comprises a finger touch location or a mouse click location or a mouse hover location.

In the above-mentioned method, after displaying the access identification of the at least one piece of description information about the target point of interest, the method further comprises:
  acquiring description information about the target point of interest corresponding to a second trigger location on the electronic map according to the second trigger location and the access identification of at least one piece of description information about the target point of interest; and
  displaying the description information about the target point of interest.

In the above-mentioned method, acquiring description information about the target point of interest corresponding to the second trigger location comprises:
  acquiring description information about the target point of interest prestored in a relevant terminal; or downloading the description information about the target point of interest from a server;
  wherein the method of downloading the description information about the target point of interest from a server comprises wireless download or wired download, and the wireless download comprises downloading using a mobile cellular network, downloading using a 3rd generation mobile communication technology (3G) network, downloading using a 4th generation mobile communication technology (4G) network or downloading using a wireless network.

In the above-mentioned method, the description information about the target point of interest comprises at least one of the following formats: a picture format, an audio format, a video format and a text format.

In the above-mentioned method, the description information about the target point of interest comprises at least one piece of the following information: a point of interest picture, a point of interest introduction, a point of interest panoramic image and point of interest path information.

In the above-mentioned method, the method further comprises:
  acquiring a photograph of the target point of interest taken by a photographic device of a relevant terminal; and
  sending the photograph of the target point of interest to a server.

The embodiments of the present invention further provide a system for pushing point of interest information, comprising:
  a display unit for displaying an electronic map;
  a first processing unit for determining a target point of interest on the electronic map;

a second processing unit for acquiring an access identification of at least one piece of description information about the target point of interest; and the display unit further for displaying the access identification of the at least one piece of description information about the target point of interest.

In the above-mentioned system, the first processing unit is specifically used for:

acquiring a candidate point of interest closest to a relevant terminal on the electronic map according to location information about the terminal and location information about the candidate point of interest;

acquiring a distance threshold value of and path information about the candidate point of interest closest to the terminal; and regarding the candidate point of interest closest to the terminal as the target point of interest if the distance between the terminal and the candidate point of interest closest to the terminal is less than or equal to the distance threshold value and the path information comprises a motion path of the terminal.

In the above-mentioned system, the first processing unit is specifically used for:

acquiring at least one candidate point of interest closest to a relevant terminal on the electronic map according to location information about the terminal and location information about the candidate point of interest;

acquiring user interest information about a client; and determining the target point of interest according to the user interest information and the at least one candidate point of interest.

In the above-mentioned system, the first processing unit is specifically used for:

determining the target point of interest according to a first trigger location on the electronic map;

wherein the first trigger location comprises a finger touch location or a mouse click location or a mouse hover location.

In the above-mentioned system, the system further comprises:

a third processing unit for acquiring description information about the target point of interest corresponding to a second trigger location on the electronic map according to the second trigger location and the access identification of at least one piece of description information about the target point of interest; and the display unit further for displaying the description information about the target point of interest.

In the above-mentioned system, the third processing unit is specifically used for:

acquiring description information about the target point of interest prestored in a relevant terminal; or, downloading the description information about the target point of interest from a server;

wherein the method of downloading the description information about the target point of interest from a server comprises wireless download or wired download, and the wireless download comprises downloading using a mobile cellular network, downloading using a 3G network, downloading using a 4G network or downloading using a wireless network.

In the above-mentioned system, the description information about the target point of interest comprises at least one of the following formats: a picture format, an audio format, a video format and a text format.

In the above-mentioned system, the description information about the target point of interest comprises at least one piece of the following information: a point of interest picture, a point of interest introduction, a point of interest panoramic image and point of interest path information.

In the above-mentioned system, the system further comprises:

a fourth processing unit for acquiring a photograph of the target point of interest taken by a photographic device of a relevant terminal; and an output unit for sending the photograph of the target point of interest to a server.

It can be seen from the foregoing technical solutions that the embodiments of the present invention have the following beneficial effects:

in the embodiments of the present invention, a client can display an access identification of description information about a determined target point of interest while an electronic map is displayed; therefore, an access ingress of the description information about the target point of interest can be directly pushed to a user, and compared with a user manually searching for point of interest information or using the method of a client acquiring scenic region information in the prior art, the efficiency of pushing point of interest information is improved, description information about a point of interest is acquired in time, and operating costs are reduced.

BRIEF DESCRIPTION OF THE DRAWINGS

In order to illustrate the technical solutions in the embodiments of the present invention more clearly, the accompanying drawings required for use in the embodiments are briefly introduced below. Obviously, the accompanying drawings in the following description are merely some embodiments of the present invention, and those of ordinary skill in the art may further obtain other drawings according to these accompanying drawings without making any inventive effort.

DETAILED DESCRIPTION OF THE PREFERRED EMBODIMENTS

For better understanding of the technical solutions of the present invention, the embodiments of the present invention are described in detail hereinbelow in conjunction with the accompanying drawings.

It shall be clear that the embodiments described are merely some of the embodiments of the present invention rather than all the embodiments. All other embodiments obtained by those of ordinary skill in the art based on the embodiments in the present invention without making any inventive effort are within the scope of protection of the present invention.

The terms used in the embodiments of the present invention are merely for the purpose of illustrating specific embodiments, and are not intended to limit the present invention. The terms "a/an", "said" and "the" of singular forms used in the embodiments of the present invention and the appended claims are also intended to include plural forms, unless otherwise specified in the context clearly. It shall also be understood that the term "and/or" used herein indicates and includes any or all possible combinations of one or more associated listed items.

It shall be understood that, although terms such as first, second and third may be used in the embodiments of the present invention to describe various audio data and frequency domain data, the audio data and frequency domain data shall not be limited to these terms. These terms are merely used for distinguishing the audio data from the frequency domain data.

As used herein, the term "if" or "as if" may be construed to mean "when" or "upon" or "in response to determining" or "in response to detecting", depending on the context. Similarly, the phrase "if it is determined that" or "if it is detected that (a stated condition or event)" may be construed to mean "upon determining" or "in response to determining" or "upon detecting (the stated condition or event)" or "in response to detecting (the stated condition or event)", depending on the context.

Figure 1:
FIG. 1 is a system used by the technical solutions provided in the embodiments of the present invention.

The system used by the technical solutions provided in the embodiments of the present invention is shown in FIG. 1, which is mainly composed of a client and a server, and the method and system provided in the embodiments of the present invention are achieved at a client side. In the embodiments of the present invention, the client may comprise a map client, a navigation client or a tourist guide client, etc., a terminal where the client is located may comprise a navigation terminal, a tourist guide terminal or a user equipment, and the user equipment may comprise a personal computer (PC), a notebook computer, a mobile phone or a tablet computer, etc.

Figure 2:
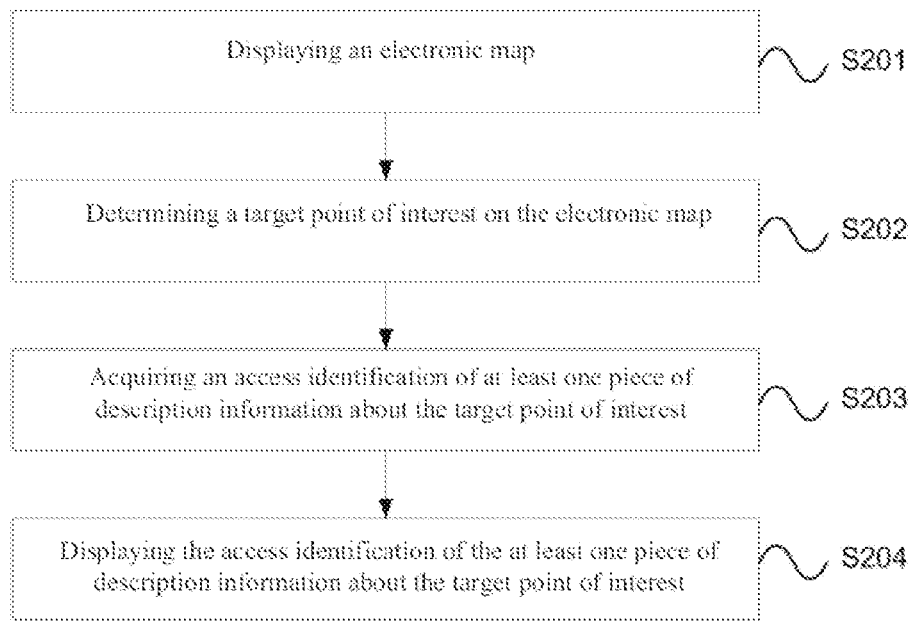
FIG. 2 is a schematic flowchart of a method for pushing point of interest information provided in the embodiments of the present invention.

The embodiments of the present invention provide a method for pushing point of interest information. With reference to FIG. 2, this is a schematic flowchart of a method for pushing point of interest information provided in the embodiments of the present invention. As shown in the figure, the method comprises the steps as follows:

S201, an electronic map is displayed.

Specifically, after a user opens a client, the client displays an electronic map.

Preferably, the client may acquire location information about a terminal where it is located, and then the location of the terminal where the client is located is labeled in the electronic map while the electronic map is displayed; or the client may only display the electronic map.

S202, a target point of interest on the electronic map is determined.

Specifically, by way of example, in the embodiments of the present invention, determining a target point of interest on the electronic map may comprise the following three methods:

the first method: firstly, a client acquires a candidate point of interest closest to a terminal where the client is located on the electronic map according to location information about the terminal and location information about candidate points of interest.

By way of example, the method for the client to acquire the location information about the terminal where the client is located may comprise the following three methods:

the first method: the client may invoke a global positioning system (GPS) interface provided by an operating system of the terminal where the client is located so as to acquire the location information about the terminal detected by a GPS module from the GPS module.

The second method: when the terminal does not open a GPS function or cannot use the GPS function because of weather and damage on hardware, etc., the client may invoke a wireless-fidelity (Wi-Fi) interface provided by the operating system of the terminal where the client is located and acquires at least one Wi-Fi hotspot around the terminal from a Wi-Fi module, and the Wi-Fi hotspot may comprise an encrypted Wi-Fi hotspot and/or an unencrypted Wi-Fi hotspot. Then, the client acquires location information corresponding to each Wi-Fi hotspot from a preset Wi-Fi database according to at least one Wi-Fi hotspot, and then acquires the location information about the terminal according to the location information corresponding to each Wi-Fi hotspot.

For example, Wi-Fi hotspots around a terminal acquired by a client comprise: Wi-Fi 1, Wi-Fi 2, . . . , Wi-Fi n; accordingly, location information acquired from a Wi-Fi database comprises: $(x_1, y_1)$, $(x_2, y_2)$, . . . , $(x_n, y_n)$, and location information about the terminal acquired by the client according to the location information is $((x_1+x_2+\ldots+x_n)/n, (y_1+y_2+\ldots+y_n)/n)$.

The third method: a server detects the signal strength of the terminal where the client is located and the location of a base station providing a signal for the terminal, and calculates the distance between the terminal and each base station providing a signal according to the signal strength of the terminal; each base station is encircled with a circular region with the distance as the radius and the base station as the circle center; in this way, a plurality of circular regions may be encircled, and the crosspoint of borders of the plurality of circular regions is the location of the terminal where the client is located; thus, the server may acquire the location information about the terminal where the client is located and then send the location information to the client, and the client may acquire the location information about the terminal where it is located.

After the client acquires the location information about the terminal where it is located, location information about each candidate point of interest in an electronic map is read from a map database, and the distance between the terminal and each candidate point of interest is then calculated, so that a candidate point of interest closest to the terminal on the electronic map may be acquired. For example, if location information about a terminal where a client is located is $(x_1, y_1)$ and location information about a candidate point of interest A is $(x_A, y_A)$, the distance between the terminal and the candidate point of interest A is $D=\sqrt{(y_A-y_1)^2+(x_A-x_1)^2}$, and the terminal may rank candidate points of interest according to an ascending order of a distance D, and the candidate point of interest ranked in the first place is the candidate point of interest closest to the terminal on an electronic map.

Then, after the candidate point of interest closest to the terminal on the electronic map is acquired, the client may acquire a distance threshold value of and path information about the candidate point of interest closest to the terminal from a map database according to the acquired candidate point of interest. The distance threshold value and path information are used for judging whether the candidate point of interest can be taken as a target point of interest of the client, and the path information refers to which paths arrive at the candidate point of interest.

Finally, the client compares the distance between the terminal where it is located and the candidate point of interest closest to the terminal with the above-mentioned distance threshold value, and judges whether a motion path of the terminal where the client is located belongs to the path information. The candidate point of interest closest to the terminal is regarded as the target point of interest if the distance between the terminal and the candidate point of interest closest to the terminal is less than or equal to the distance threshold value and several paths included in the path information comprise a motion path of the terminal. Otherwise, the client does not regard the candidate point of interest closest to the terminal as the target point of interest if the distance between the terminal and the candidate point of interest closest to the terminal is greater than the distance threshold value, or the distance between the terminal and the candidate point of interest closest to the terminal is less than or equal to the distance threshold value but several paths included in the path information do not comprise the motion path of the terminal. That is to say, when the terminal where the client is located is within a certain range of the candidate point of interest, and arrives at the candidate point of interest according to one path in several paths corresponding to the candidate point of interest, the candidate point of interest may be regarded as the target point of interest.

The second method: firstly, the client may use any one of the above-mentioned three methods to acquire the location information about the terminal where the client is located, which will not be described here. After the client acquires the location information about the terminal where it is located, location information about each candidate point of interest in an electronic map is read from a map database and the distance D between the terminal and each candidate point of interest is calculated according to the location information about the terminal where the client is located and location information about candidate points of interest; the terminal may rank the candidate points of interest according to an ascending order of the distance D; and at least one candidate point of interest closest to the terminal on the electronic map is acquired according to at least one top-ranked candidate point of interest in the ranking result.

Then, the client may send a request message to the server, and the server acquires user interest information corresponding to the client in a user database according to the request message and returns the user interest information to the client so that the client may acquire the user interest information. Preferably, the user interest information may include at least one interest category, and the interest category may include history, culture, science and technology, sport, cartoons and music, etc.

Finally, the client determines the target point of interest according to the user interest information and the at least one candidate point of interest. For example, a client may acquire at least one candidate point of interest belonging to at least one interest category in at least one candidate point of interest according to the at least one interest category and type information about each candidate point of interest in at least one candidate point of interest; if at least one candidate point of interest has only one candidate point of interest belonging to an interest category in user interest information, the candidate point of interest may be directly regarded as a target point of interest; and if at least one candidate point of interest has at least two candidate points of interest belonging to an interest category in user interest information, one of the at least two candidate points of interest may be randomly selected as a target point of interest, or a candidate point of interest with the highest user evaluation of the at least two candidate points of interest may be regarded as a target point of interest. For example, type information about a candidate point of interest "the Summer Palace" is "history", and if at least one interest category corresponding to a client includes history, the candidate point of interest "the Summer Palace" may be taken as a target point of interest; and as another example, the type of a candidate point of interest "China Science and Technology Museum" is "science and technology", and if at least one interest category corresponding to a client includes science and technology, the candidate point of interest "China Science and Technology Museum" may be taken as a target point of interest.

The third method: the client may determine the target point of interest according to a first trigger location on the electronic map. For example, a sensor arranged in a terminal may detect a first trigger location of a user on a display screen of the terminal, with the first trigger location comprising a finger touch location or a mouse click location or a mouse hover location. The sensor sends the detected first trigger location to the client, and then the client may acquire a candidate point of interest corresponding to the first trigger location on an electronic map according to the first trigger location on the electronic map, and regards the candidate point of interest as a target point of interest. That is to say, the third method may be to regard the candidate point of interest directly selected from the electronic map by the user as a target point of interest.

S203, an access identification of at least one piece of description information about the target point of interest is acquired.

Specifically, after determining a target point of interest, a client needs to send a request message to a server, wherein the request message carries an identification of the target point of interest, e.g., location information about the target point of interest or a name of the target point of interest; after receiving the request message, according to the identification of the target point of interest, the server searches for an access identification of at least one piece of description information corresponding to the target point of interest in a point of interest database, and then sends the access identification of the at least one piece of description information to the client via a response message; and in this way, the client may acquire the access identification of the at least one piece of description information about the target point of interest.

Preferably, an access identification of at least one piece of description information about a target point of interest refers to an access link of at least one piece of description information about the target point of interest, and by means of the triggered access link of the description information, a client may display description information about the target point of interest corresponding to the access link of the description information, wherein the access link of the at least one piece of description information may be an access link in an icon form and may also be an access link in a text form.

S204, the access identification of the at least one piece of description information about the target point of interest is displayed.

Specifically, after a client acquires an access identification of at least one piece of description information about a target point of interest from a server, the client displays the access identification of the at least one piece of description information about the target point of interest.

For example, a client may display an access identification of at least one piece of description information while displaying an electronic map, and the access identification of the at least one piece of description information may be located at the top right corner, top left corner, bottom left corner or bottom right corner of the electronic map, and may also be located near a target point of interest in the electronic map.

Optionally, after S204, the method may further comprise:

acquiring description information about the target point of interest corresponding to a second trigger location on the electronic map according to the second trigger location and the access identification of the at least one piece of description information about the target point of interest; and displaying the description information about the target point of interest.

Specifically, a sensor arranged in a terminal may detect a second trigger location of a user on a display screen of the terminal, with the second trigger location comprising a finger touch location or a mouse click location or a mouse hover location. The sensor sends the detected second trigger location to the client, and then the client may determine an access identification of description information about a target point of interest corresponding to the second trigger location on an electronic map according to the second trigger location on the electronic map and an access identification of at least one piece of description information about the target point of interest displayed. For example, after a client displays an access identification of at least one piece of description information about a target point of interest, a user touches an access identification of one piece of description information on a touch screen, and the client may determine that the access identification of which piece of description information the user selects according to the location touched by the user on the touch screen.

After determining the access identification of the description information about the target point of interest corresponding to the second trigger location, the client determines the description information about the target point of interest corresponding to the second trigger location which needs to be acquired. Preferably, in the embodiments of the present invention, the method for the client to acquire the description information about the target point of interest corresponding to the second trigger location may comprise the following two methods:

The first method: the terminal may prestore description information corresponding to the access identification of the description information about the target point of interest, and when it is necessary to further display the description information about the target point of interest, the client may acquire the description information about the corresponding target point of interest according to the determined access identification of the description information about the target point of interest; thus, the client achieves acquiring the description information about the target point of interest prestored in the terminal where the client is located. That is to say, the terminal may download in advance and store the description information about the target point of interest, and when the client needs the description information about the target point of interest, the stored description information about the target point of interest may be acquired directly.

The second method: after the client determines the access identification of the description information about the target point of interest, the client may send a request message to a server, wherein the request message carries the access identification of the description information about the target point of interest; the server reads the description information about the corresponding target point of interest in a point of interest database according to the access identification, and then returns the description information about the target point of interest to the client; and that is to say, the client may download the description information about the corresponding target point of interest from the server in real time. Preferably, the method of a client downloading description information about the corresponding target point of interest from a server comprises wireless download or wired download. The wireless download may comprise downloading using a mobile cellular network, downloading using a 3rd generation mobile communication technology (3G) network, downloading using a 4th generation mobile communication technology (4G) network or downloading using a wireless network.

In the above-mentioned two methods, the description information about the target point of interest comprises at least one of the following formats: a picture format, an audio format, a video format and a text format. The description information about the target point of interest comprises at least one piece of the following information: a point of interest picture, a point of interest introduction, a point of interest panoramic image and point of interest path information.

For example, if the target point of interest is a scenic spot, a client may display a picture of a landmark building in the scenic spot, or the client may play voice tourist guide information, or the client may play a video of the scenic spot, or the client may display an introduction or path information about the scenic spot, or the client may play a panoramic image of the scenic spot.

Optionally, the method may further comprise:
acquiring a photograph of the target point of interest taken by a photographic device of a relevant terminal; and sending the photograph of the target point of interest to a server.

Specifically, a user may use a photographic device of a terminal to take a photograph of a target point of interest, and the photograph may be stored in the internal memory of the terminal; a client may acquire the photograph of the target point of interest taken by the photographic device of the terminal where the client is located from the internal memory of the terminal, and then sends the photograph of the target point of interest to a server; and in this way, the server may acquire a lot of photographs of the target point of interest uploaded by the client, and these photographs may be supplied to other clients for other users to browse.

The embodiments of the present invention further give a device embodiment implementing each step and method in the above-mentioned method embodiment.

Figure 3:
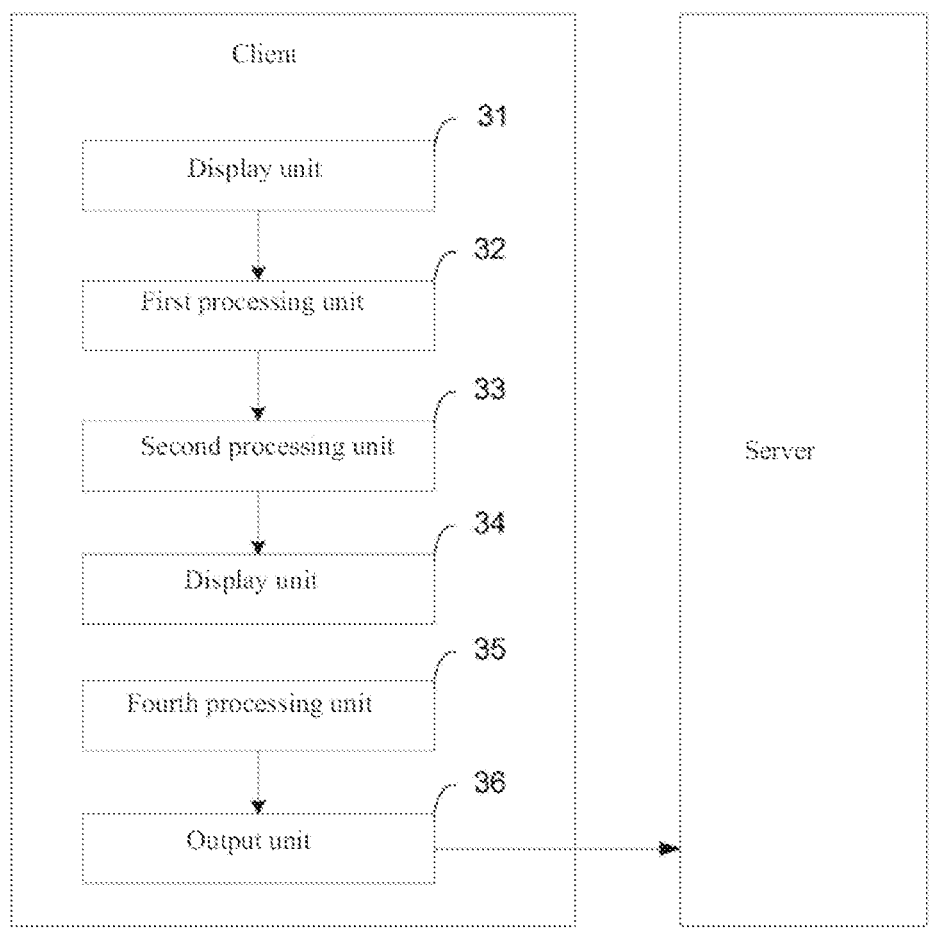
FIG. 3 is a functional block diagram of a system for pushing point of interest information provided in the embodiments of the present invention.

With reference to FIG. 3, this is a functional block diagram of a system for pushing point of interest information provided in the embodiments of the present invention. As shown in the figure, the system comprises:

a display unit 30 for displaying an electronic map;

a first processing unit 31 for determining a target point of interest on the electronic map;

a second processing unit 32 for acquiring an access identification of at least one piece of description information about the target point of interest; and the display unit 33 further for displaying the access identification of the at least one piece of description information about the target point of interest.

Preferably, the first processing unit 31 is specifically used for:

acquiring a candidate point of interest closest to a relevant terminal on the electronic map according to location information about the terminal and location information about the candidate point of interest;

acquiring a distance threshold value of and path information about the candidate point of interest closest to the terminal; and regarding the candidate point of interest closest to the terminal as the target point of interest if the distance between the terminal and the candidate point of interest closest to the terminal is less than or equal to the distance threshold value and the path information comprises a motion path of the terminal.

Preferably, the first processing unit 31 is specifically used for:

acquiring at least one candidate point of interest closest to a relevant terminal on the electronic map according to location information about the terminal and location information about the candidate point of interest;

acquiring user interest information about a client; and determining the target point of interest according to the user interest information and the at least one candidate point of interest.

Preferably, the first processing unit 31 is specifically used for:

determining the target point of interest according to a first trigger location on the electronic map;

wherein the first trigger location comprises a finger touch location or a mouse click location or a mouse hover location.

Preferably, the system further comprises: a third processing unit 34 for acquiring description information about the target point of interest corresponding to a second trigger location on the electronic map according to the second trigger location and the access identification of at least one piece of description information about the target point of interest; and the display unit 30 further for displaying the description information about the target point of interest.

Preferably, the third processing unit 34 is specifically used for:

acquiring description information about the target point of interest prestored in a relevant terminal; or downloading the description information about the target point of interest from a server;

wherein the method of downloading the description information about the target point of interest from a server comprises wireless download or wired download, and the wireless download comprises downloading using a mobile cellular network, downloading using a 3G network, downloading using a 4G network or downloading using a wireless network.

Preferably, the description information about the target point of interest comprises at least one of the following formats: a picture format, an audio format, a video format and a text format.

Preferably, the description information about the target point of interest comprises at least one piece of the following information: a point of interest picture, a point of interest introduction, a point of interest panoramic image and point of interest path information.

Preferably, the system further comprises:

a fourth processing unit 35 for acquiring a photograph of the target point of interest taken by a photographic device of a relevant terminal; and an output unit 36 for sending the photograph of the target point of interest to a server.

Since various units in this embodiment can execute the method shown in FIG. 2, for a part that is not described in detail in this embodiment, reference may be made to relevant explanations about FIG. 2.

The technical solutions of the embodiments of the present invention have the following beneficial effects:

1. in the embodiments of the present invention, a client can display an access identification of description information about a determined target point of interest while an electronic map is displayed; therefore, an access ingress of the description information about the target point of interest can be directly pushed to a user; when the access ingress is further triggered, the client can display the description information about the target point of interest in time; and compared with a user manually searching for point of interest information or using the method of a client acquiring scenic region information in the prior art, the efficiency of pushing point of interest information is improved, description information about a point of interest is acquired in time, and operating costs are reduced, which brings great convenience to the user.

2. The technical solutions provided in the embodiments of the present invention can be applied to a map client, and therefore, a user can acquire description information about a point of interest without payment, which reduces the usage cost for the user.

The foregoing are merely preferred embodiments of the present invention, but are not intended to limit the present invention. Any modifications, equivalent replacements, or improvements made without departing from the spirit and principle of the present invention shall fall within the scope of protection of the present invention.

What is claimed is:

1. A method for pushing point of interest information, comprising:
    displaying an electronic map;
    determining a target point of interest on the electronic map;
    acquiring an access identification of at least one piece of description information about the target point of interest;
    displaying the access identification of the at least one piece of description information about the target point of interest;
    acquiring a photograph of the target point of interest taken by a photographic device of a relevant terminal; and
    sending the photograph of the target point of interest to a server.

2. The method of claim 1, wherein said determining the target point of interest comprises:
    acquiring a candidate point of interest closest to a relevant terminal on the electronic map according to location information about the terminal and location information about the candidate point of interest;
    acquiring a distance threshold value of, and path information about, the candidate point of interest closest to the terminal;
    determining whether a distance between the terminal and the candidate point of interest closest to the terminal is less than or equal to the distance threshold value and whether the path information comprises a motion path of the terminal; and
    regarding the candidate point of interest closest to the terminal as the target point of interest based upon said determining.

3. The method of claim 1, wherein said determining the target point of interest comprises:
    acquiring at least one candidate point of interest closest to a relevant terminal on the electronic map according to location information about the terminal and location information about the candidate point of interest;
    acquiring user interest information about a client; and
    determining the target point of interest according to the user interest information and the at least one candidate point of interest.

4. The method of claim 1, wherein said determining the target point of interest comprises determining the target point of interest according to a first trigger location on the electronic map.

5. The method of claim 4, wherein the first trigger location is selected from a group consisting of a finger touch location, a mouse click location and a mouse hover location.

6. The method of claim 1, further comprising:
    acquiring description information about the target point of interest corresponding to a second trigger location on the electronic map according to the second trigger location and the access identification of the at least one piece of description information about the target point of interest, said acquiring the description information occurring after said displaying the access identification; and
    displaying the description information about the target point of interest.

7. The method of claim 6, wherein said acquiring the description information comprises at least one of acquiring the description information about the target point of interest prestored in a relevant terminal and downloading the description information about the target point of interest from the server.

8. The method of claim 1, wherein the description information about the target point of interest comprises at least one of the following formats: a picture format, an audio format, a video format and a text format.

9. The method of claim 1, wherein the description information about the target point of interest comprises at least information selected from a group consisting of a point of interest picture, a point of interest introduction, a point of interest panoramic image and point of interest path information.

10. A system for pushing point of interest information, comprising:
   a display unit for displaying an electronic map;
   a first processing unit for determining a target point of interest on the electronic map; and
   a second processing unit for acquiring an access identification of at least one piece of description information about the target point of interest;
   a fourth processing unit for acquiring a photograph of the target point of interest taken by a photographic device of a relevant terminal; and
   an output unit for sending the photograph of the target point of interest to a server,
   wherein said display unit is configured to display the access identification of the at least one piece of description information about the target point of interest.

11. The system of claim 10, wherein said first processing unit is configured for:
   acquiring a candidate point of interest closest to a relevant terminal on the electronic map according to location information about the terminal and location information about the candidate point of interest;
   acquiring a distance threshold value of, and path information about, the candidate point of interest closest to the terminal;
   determining whether a distance between the terminal and the candidate point of interest closest to the terminal is less than or equal to the distance threshold value and whether the path information comprises a motion path of the terminal; and
   regarding the candidate point of interest closest to the terminal as the target point of interest based upon said determining.

12. The system of claim 10, wherein said first processing unit is configured for:
   acquiring at least one candidate point of interest closest to a relevant terminal on the electronic map according to location information about the terminal and location information about the candidate point of interest;
   acquiring user interest information about a client; and
   determining the target point of interest according to said user interest information and said at least one candidate point of interest.

13. The system of claim 10, wherein said first processing unit is configured for determining the target point of interest according to a first trigger location on the electronic map.

14. The system of claim 13, wherein the first trigger location is selected from a group consisting of a finger touch location, a mouse click location and a mouse hover location.

15. The system of claim 10, further comprising:
   a third processing unit for acquiring description information about the target point of interest corresponding to a second trigger location on the electronic map according to the second trigger location and the access identification of the at least one piece of description information about the target point of interest,
   wherein said display unit is further configured for displaying the description information about the target point of interest.

16. The system of claim 15, wherein said third processing unit is configured for acquiring description information about the target point of interest prestored in a relevant terminal; or downloading the description information about the target point of interest from the server.

17. The system of claim 10, wherein the description information about the target point of interest comprises at least one of the following formats: a picture format, an audio format, a video format and a text format.

18. The system of claim 10, wherein the description information about the target point of interest comprises information selected from a group consisting of a point of interest picture, a point of interest introduction, a point of interest panoramic image and point of interest path information.

* * * * *